C. F., C. G., L. K. AND J. T. REDMON.
SHAFT FASTENING.
APPLICATION FILED AUG. 7, 1919.
1,367,500.
Patented Feb. 1, 1921.
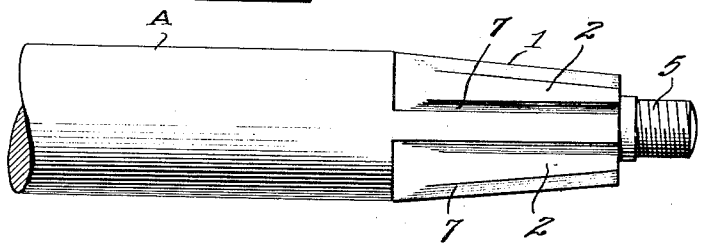
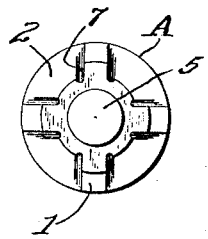
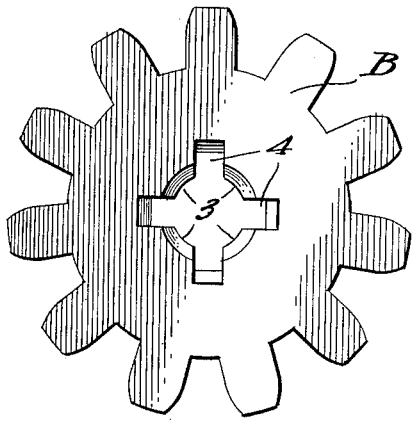
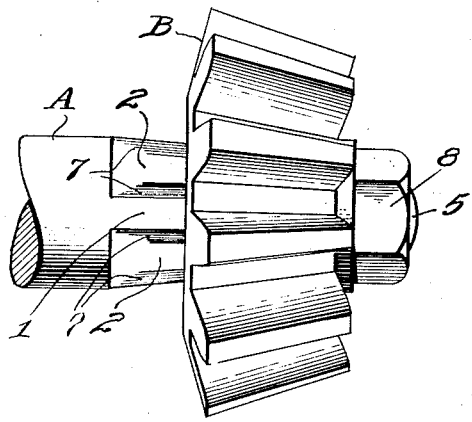
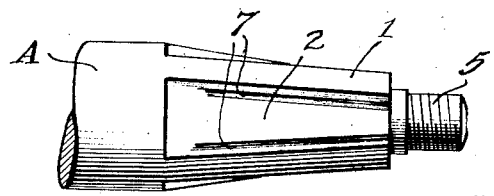
Inventors
C. F. Redmon
C. G. Redmon
L. K. Redmon
AND J. T. Redmon
By William Fletcher & Co.
Attorney

UNITED STATES PATENT OFFICE.

CLAUDE F. REDMON, CLAUDE G. REDMON, LILLARD K. REDMON, AND JOHN T. REDMON, OF PARIS, KENTUCKY.

SHAFT-FASTENING.

1,367,500.  Specification of Letters Patent.  Patented Feb. 1, 1921.

Application filed August 7, 1919. Serial No. 315,988.

*To all whom it may concern:*

Be it known that we, CLAUDE F. REDMON, CLAUDE G. REDMON, LILLARD K. REDMON, and JOHN T. REDMON, citizens of the United States, residing at Paris, in the county of Bourbon and State of Kentucky, have invented certain new and useful Improvements in Shaft-Fastenings; and we do hereby declare the following to be a full, clear, and exact description of the invention, such as will enable others skilled in the art to which it appertains to make and use the same.

This invention relates to means affixing rotors to their impellers and while particularly intended to apply to fixing pinions in automobiles to their shafts is not limited thereto.

An object of the invention is to avoid the common trouble of the shearing of keys.

A further object is to avoid the throwing off of center caused by the seating of keys.

A further object is to provide substantially integral joints between the members.

A further object is to provide means for wedging the members into a perfect seat in relation to each other.

A further object is to avoid the knocking of the teeth on gears occasioned by the loosening of the key or by the forcing effect of the key causing the parts to become eccentric.

A further object is to prevent the wearing of the gear teeth occasioned by knocking and to avoid the unpleasant noises incident thereto.

With these and other objects in view this invention comprises the construction, combination, and arrangement of parts as will be hereinafter more fully described and claimed.

In the drawing,

Figure 1 is a side view of an automobile shaft having a tapered end adapted for the purposes described herein.

Fig. 2 is an end view of the same shaft.

Fig. 3 is an automobile pinion viewed from the larger end and adapted for the purposes described herein.

Fig. 4 is a side view of the shaft and pinion assembled.

Fig. 5 is an enlarged view of a slot 2.

Like characters of reference indicate corresponding parts throughout the several views.

Numeral 1 denotes the tapered portions of the shaft A. Numerals 2 indicate slots along this taper. Numerals 3 indicate the internal bore of pinion B. Numerals 4 indicate slots in internal bore of pinion B to coöperate with portions 1. Numeral 5 indicates the extended portion of shaft A having threads thereon co-mating with the threads on a lock and seating nut 8. The roots of the slots on shaft A correspond to the taper bore on pinion B. The roots of the slots 4 on pinion B correspond to the taper portions on shaft A. These roots are so cut as to form a perfect joint. At the bottom of the root of slots 2, as shown in the enlarged view of Fig. 5, are recesses below the seats corresponding to the pinion taper, the said recesses indicated by numeral 7, Fig. 5.

By the tightening of nut 8 the shaft and the pinion are wedged practically integral. Owing to the recess 7 any dirt or foreign matter is provided for so that the seat is practically perfect.

While the drawing shows a pinion and shaft, this same structure may be used for any type of pulley, annulus, or any rotor with an impelling member.

The slots are diametrically opposed and quadruple in number, and are as easily cut as a keyway. When, however, the two parts are fitted together they form practically an integral member perfectly centered.

We claim:

1. In a shaft coupling, the combination of a shaft having tapered slots, said slots having bottom seats and a gutter on each side of said seats, and a second member having a bore with tapered feathers corresponding to said slots and adapted to seat on the bottoms of said slots between said gutters.

2. In a shaft coupling, the combination of a shaft having a tapered end slotted to provide a plurality of feathers with tapered perimeters, seats in the bottoms of said slots having a gutter on each side, and a second member having a tapered bore similarly slotted to provide feathers adapted to seat against the bottoms of said slots on the shaft between said gutters.

In testimony whereof we affix our signatures.

CLAUDE F. REDMON.
CLAUDE G. REDMON.
LILLARD K. REDMON.
JOHN T. REDMON.